United States Patent
Lee et al.

(10) Patent No.: US 11,877,313 B2
(45) Date of Patent: Jan. 16, 2024

(54) METHOD AND APPARATUS FOR SIDELINK RETRANSMISSION IN WIRELESS COMMUNICATION SYSTEM

(71) Applicant: LG Electronics Inc., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 17/433,082

(22) PCT Filed: Feb. 24, 2020

(86) PCT No.: PCT/KR2020/002647
§ 371 (c)(1),
(2) Date: Aug. 23, 2021

(87) PCT Pub. No.: WO2020/171679
PCT Pub. Date: Aug. 27, 2020

(65) Prior Publication Data
US 2022/0150914 A1 May 12, 2022

Related U.S. Application Data

(60) Provisional application No. 62/809,625, filed on Feb. 23, 2019.

(51) Int. Cl.
*H04W 72/04* (2023.01)
*H04W 72/543* (2023.01)
(Continued)

(52) U.S. Cl.
CPC ......... *H04W 72/543* (2023.01); *H04L 1/0026* (2013.01); *H04L 1/1819* (2013.01); *H04W 92/18* (2013.01)

(58) Field of Classification Search
CPC . H04L 1/00; H04L 1/0026; H04L 1/08; H04L 1/1819; H04L 1/189; H04L 5/0055; H04W 72/543; H04W 92/01
See application file for complete search history.

(56) References Cited

U.S. PATENT DOCUMENTS 11,469,857 B2 * 10/2022 Zhou ................. H04L 1/1812
2017/0339671 A1 11/2017 Lee et al.
(Continued)

FOREIGN PATENT DOCUMENTS

KR 20170126597 11/2017
WO WO2018067400 4/2018

OTHER PUBLICATIONS

LG Electronics, "High level view on the study for eV2X," R1-166915, Presented at 3GPP TSG RAN WG1 Meeting #86, Gothenburg, Sweden, Aug. 22-26, 2016, 6 pages.

*Primary Examiner* — Phuc H Tran
(74) *Attorney, Agent, or Firm* — Fish & Richardson P.C.

(57) ABSTRACT

Proposed is a method for operating a first apparatus (100) in a wireless communication system. The method may comprise the step in which a first apparatus (100) determines a first transmission count for a sidelink service, and on the basis of the first transmission count, transmits a sidelink service to a second apparatus (200), and receives, from the second apparatus (200), one hybrid automatic repeat request (HARQ) feedback associated with the sidelink service. For example, the first transmission may comprise at least one blind retransmission.

15 Claims, 22 Drawing Sheets

(51) Int. Cl.
  *H04L 1/00*     (2006.01)
  *H04L 1/1812*   (2023.01)
  *H04W 92/18*    (2009.01)

(56) References Cited

U.S. PATENT DOCUMENTS

2019/0044667 A1    2/2019  Guo et al.
2021/0022131 A1*   1/2021  Liu ..................... H04W 72/23
2021/0028891 A1*   1/2021  Zhou .................... H04W 4/40
2022/0053496 A1*   2/2022  Yu ...................... H04L 1/1896
2022/0070878 A1*   3/2022  Lee .................. H04W 72/0453

* cited by examiner

FIG. 4
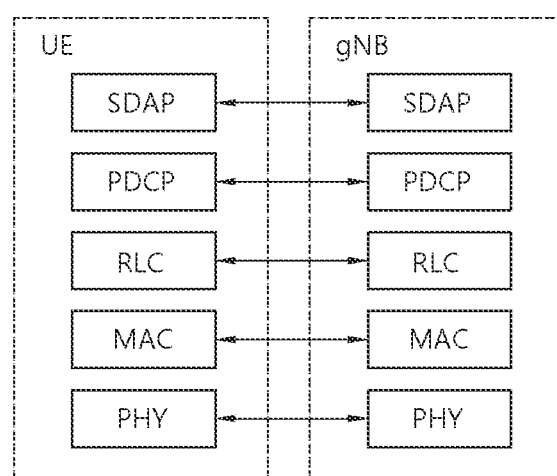
(a)
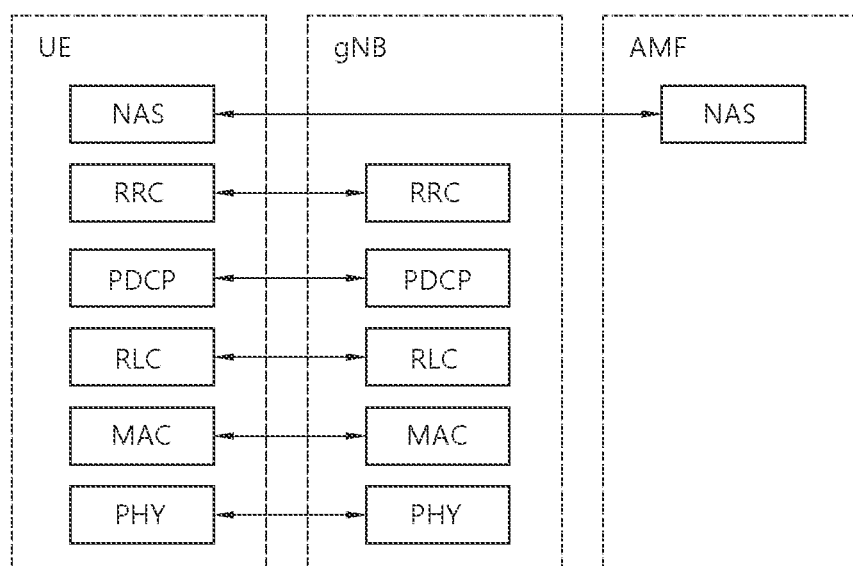
(b)

FIG. 8
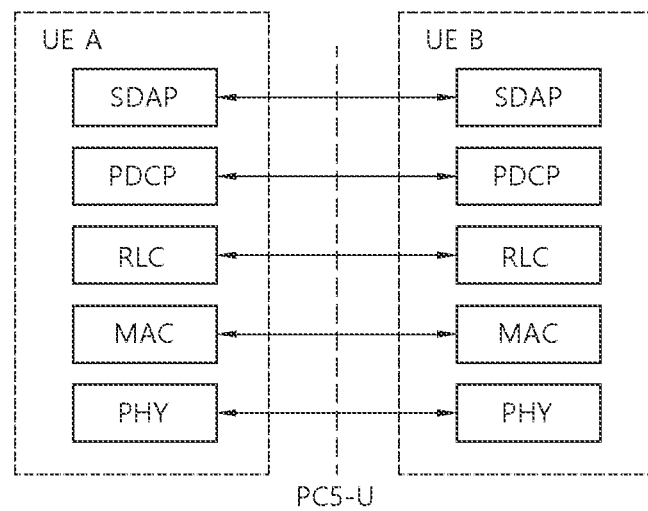
(a)
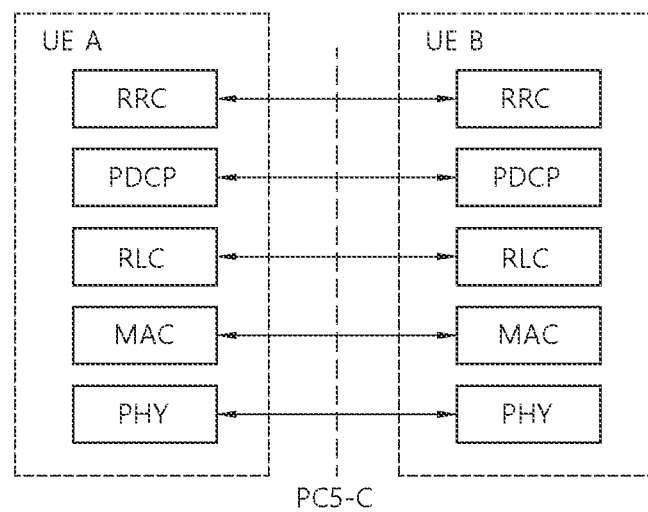
(b)

METHOD AND APPARATUS FOR SIDELINK RETRANSMISSION IN WIRELESS COMMUNICATION SYSTEM

CROSS-REFERENCE TO RELATED APPLICATIONS

This application is a National Stage application under 35 U.S.C. § 371 of International Application No. PCT/KR2020/002647, filed on Feb. 24, 2020, which claims the benefit of U.S. Provisional Application No. 62/809,625, filed on Feb. 23, 2019. The disclosures of the prior applications are incorporated by reference in their entirety.

BACKGROUND

Field

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, when a sidelink transmitting UE performs HARQ feedback-based retransmission once, the sidelink transmitting UE may perform initial transmission in the A-th slot, and the sidelink transmitting UE may receive a HARQ feedback related to the initial transmission in the A+B-th slot, the sidelink transmitting UE may perform retransmission in the A+B+C-th slot. That is, since HARQ feedback-based retransmission has a delay of C slots until retransmission, it may be difficult to satisfy the delay requirement. Accordingly, there is a need to propose a method for efficiently performing sidelink retransmission by the sidelink transmitting terminal.

Technical Solutions

In an embodiment, there is provided a method of performing wireless communication by a first apparatus 100. The method may include determining a first transmission number for a sidelink service, and transmitting the sidelink service to a second device based on the first transmission number, and receiving one hybrid automatic repeat request (HARQ) feedback related to the sidelink service from the second device. For example, the first transmission comprises at least one blind retransmission.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

Figure 1:
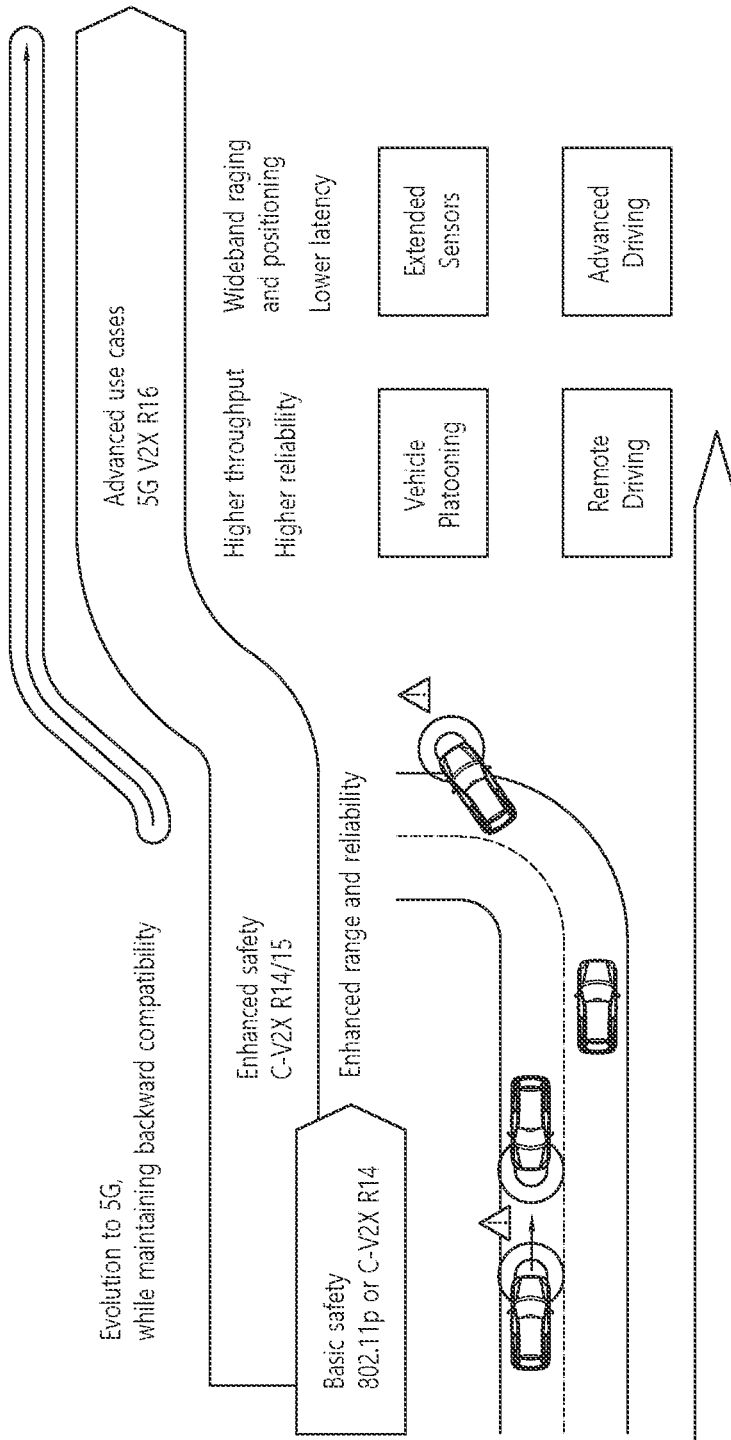
FIG. 1 is a drawing for describing V2X communication based on NR, compared to V2X communication based on RAT used before NR.

DESCRIPTION OF EXEMPLARY EMBODIMENTS e present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
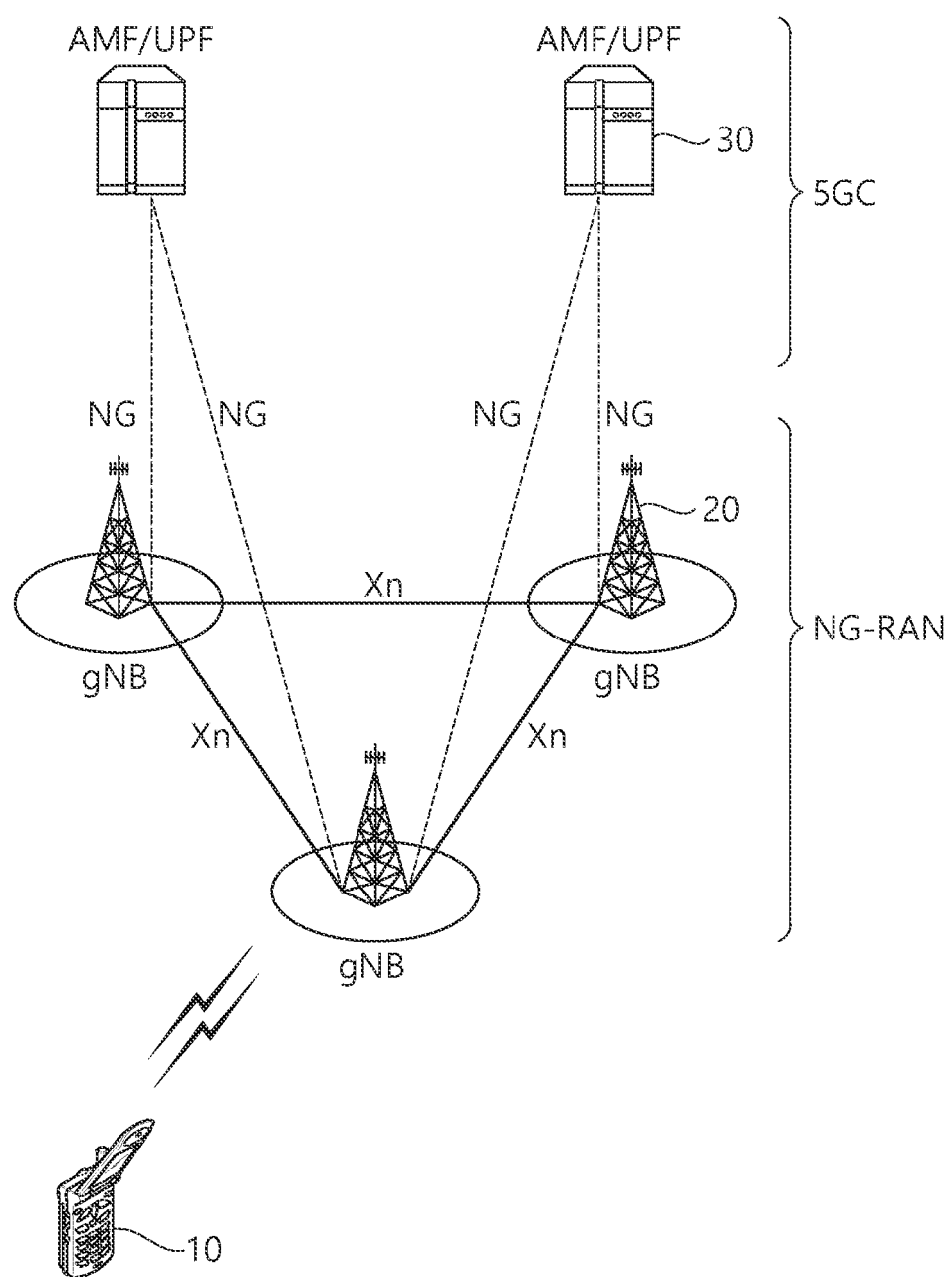
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
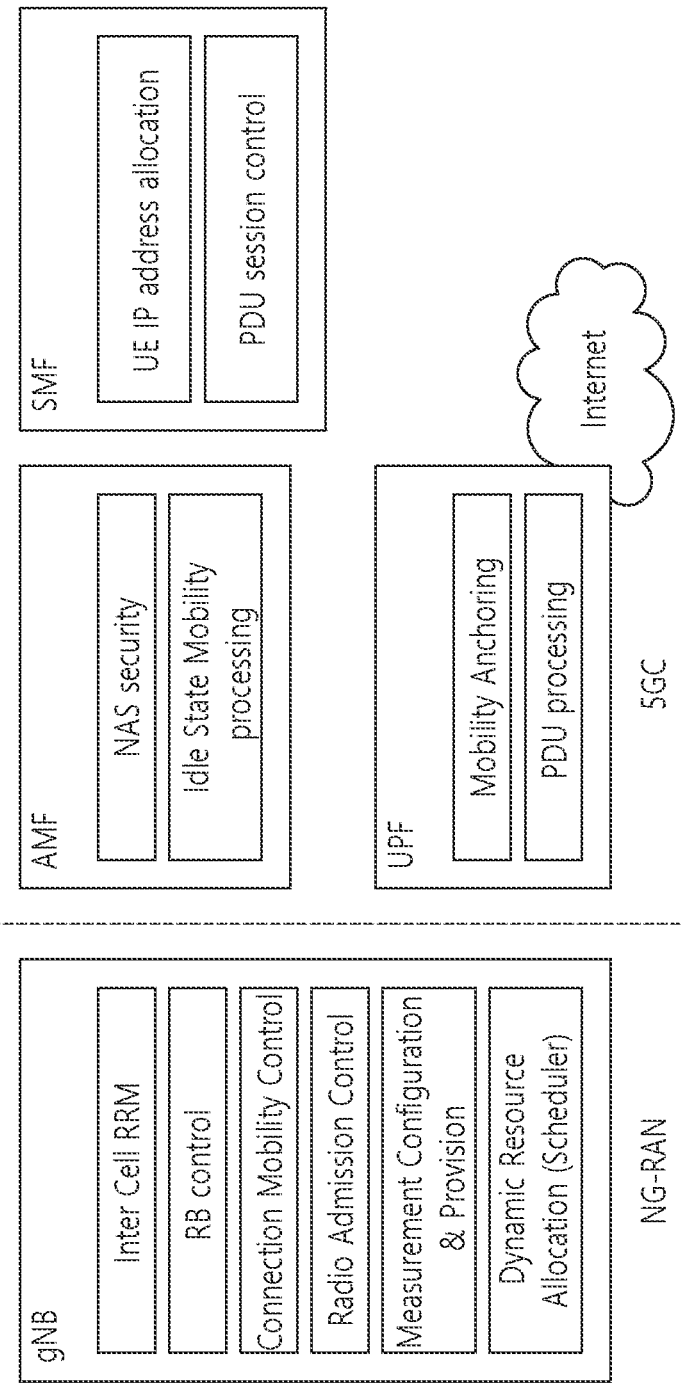
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
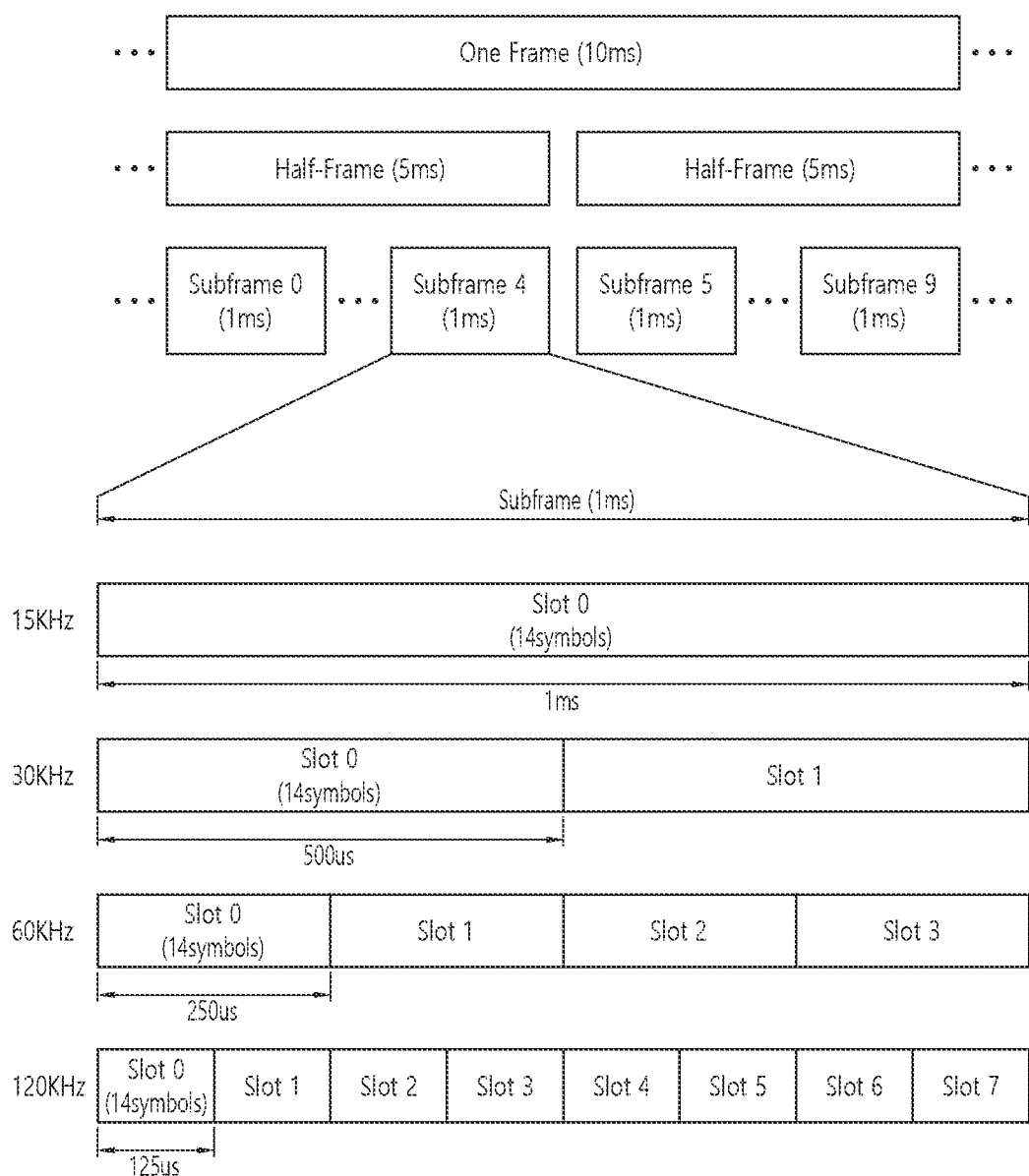
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS (15*2u) | Nslotsymb | Nframe, uslot | Nsubframe, uslot |
| --- | --- | --- | --- |
| 15 KHz (u = 0) | 14 | 10 | 1 |
| 30 KHz (u = 1) | 14 | 20 | 2 |

TABLE 1-continued

| SCS (15*2u) | Nslotsymb | Nframe, uslot | Nsubframe, uslot |
| --- | --- | --- | --- |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2u) | Nslotsymb | Nframe, uslot | Nsubframe, uslot |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
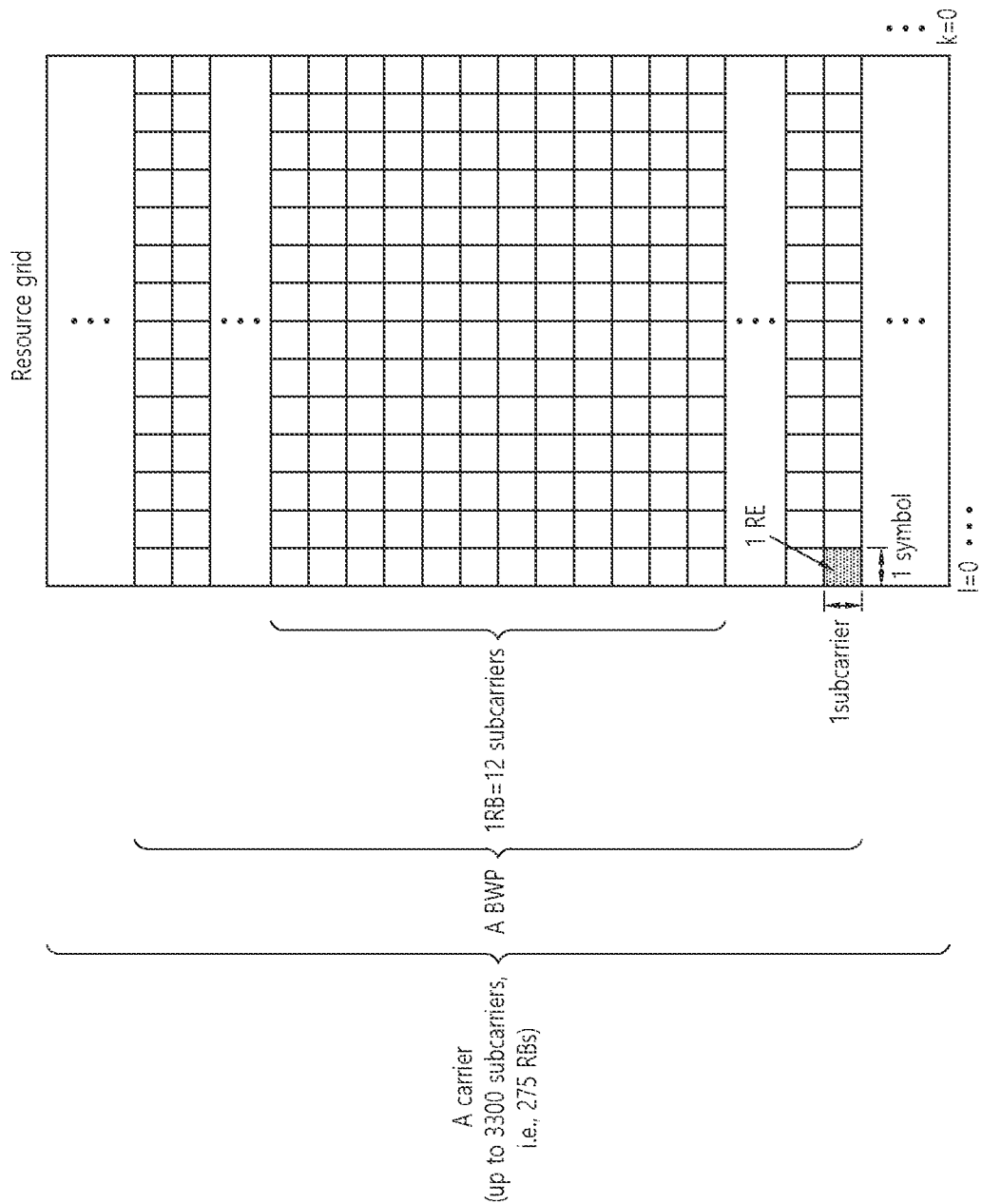
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
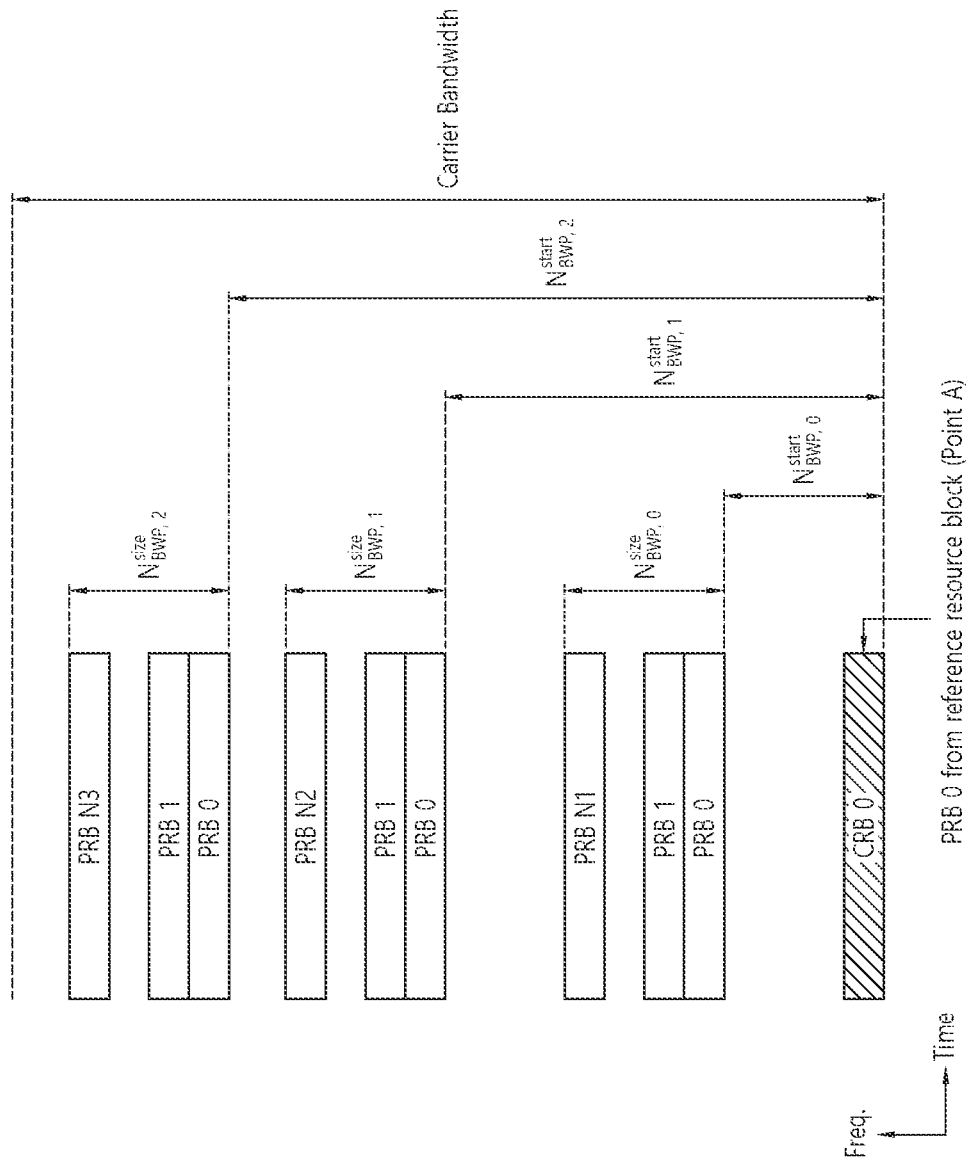
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

Figure 9:
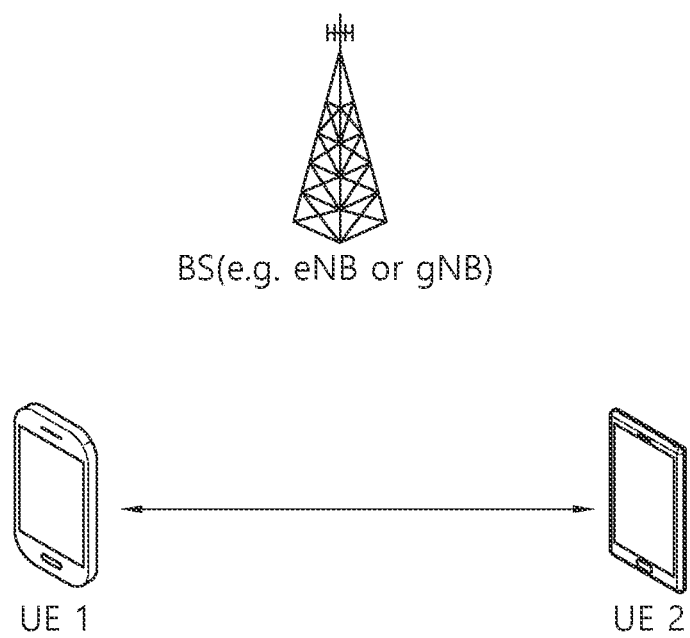
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
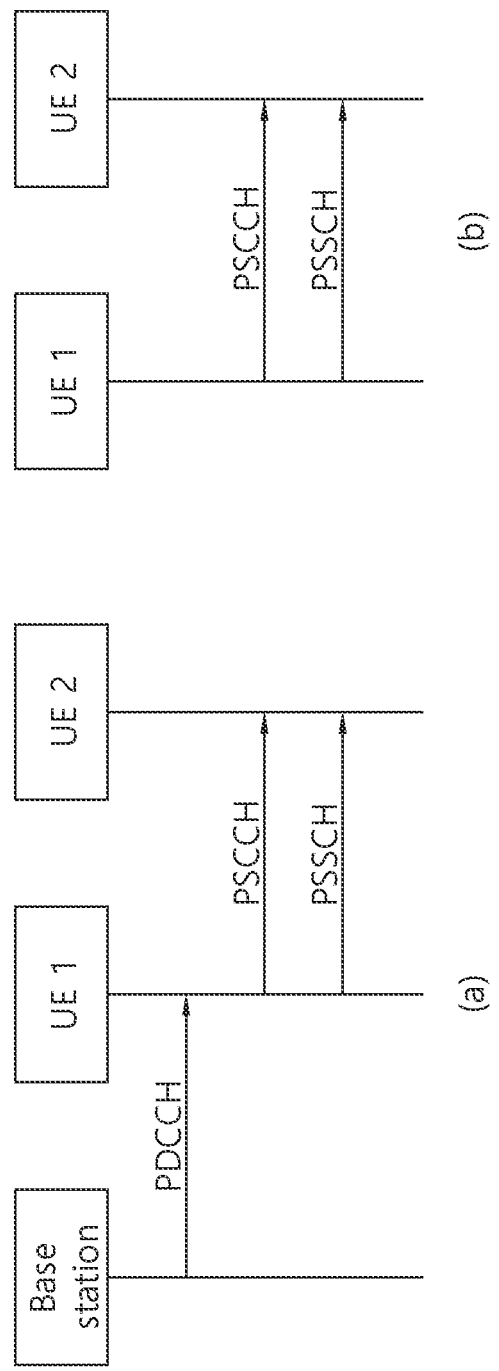
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
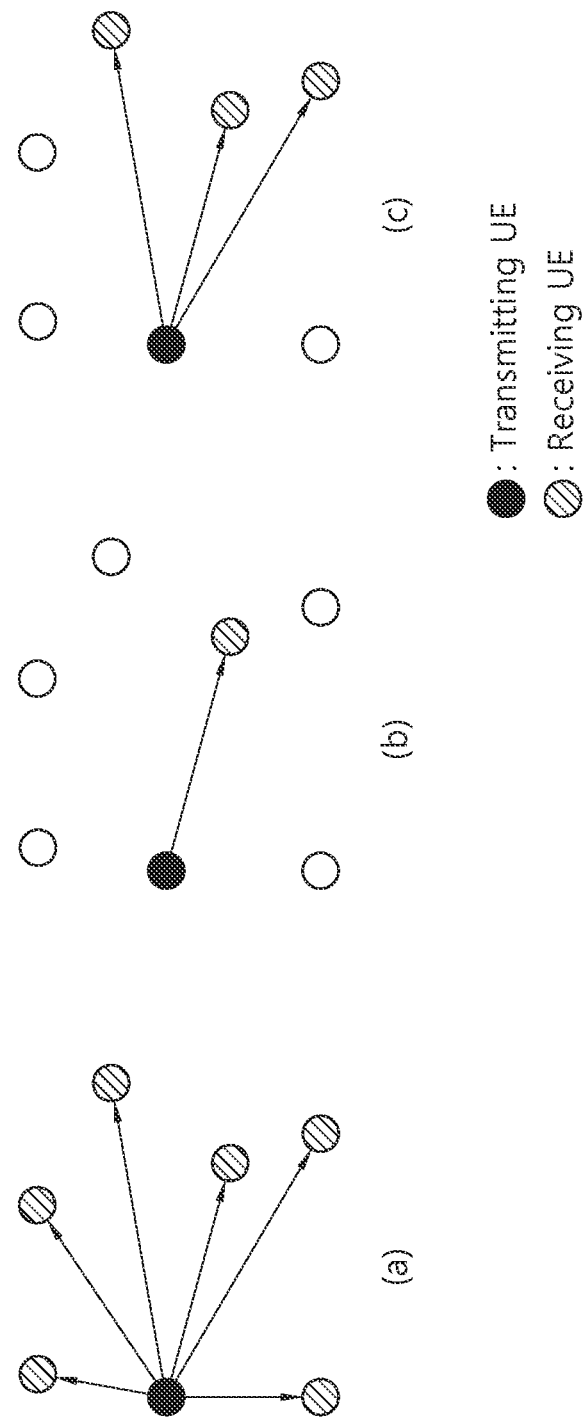
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can send and receive information as a communication terminal, select a resource for communication with or without the base station's help depending on the situation, and send and receive messages between terminals.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

The SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes a related PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, an example of channel coding will be described.

Figure 12:
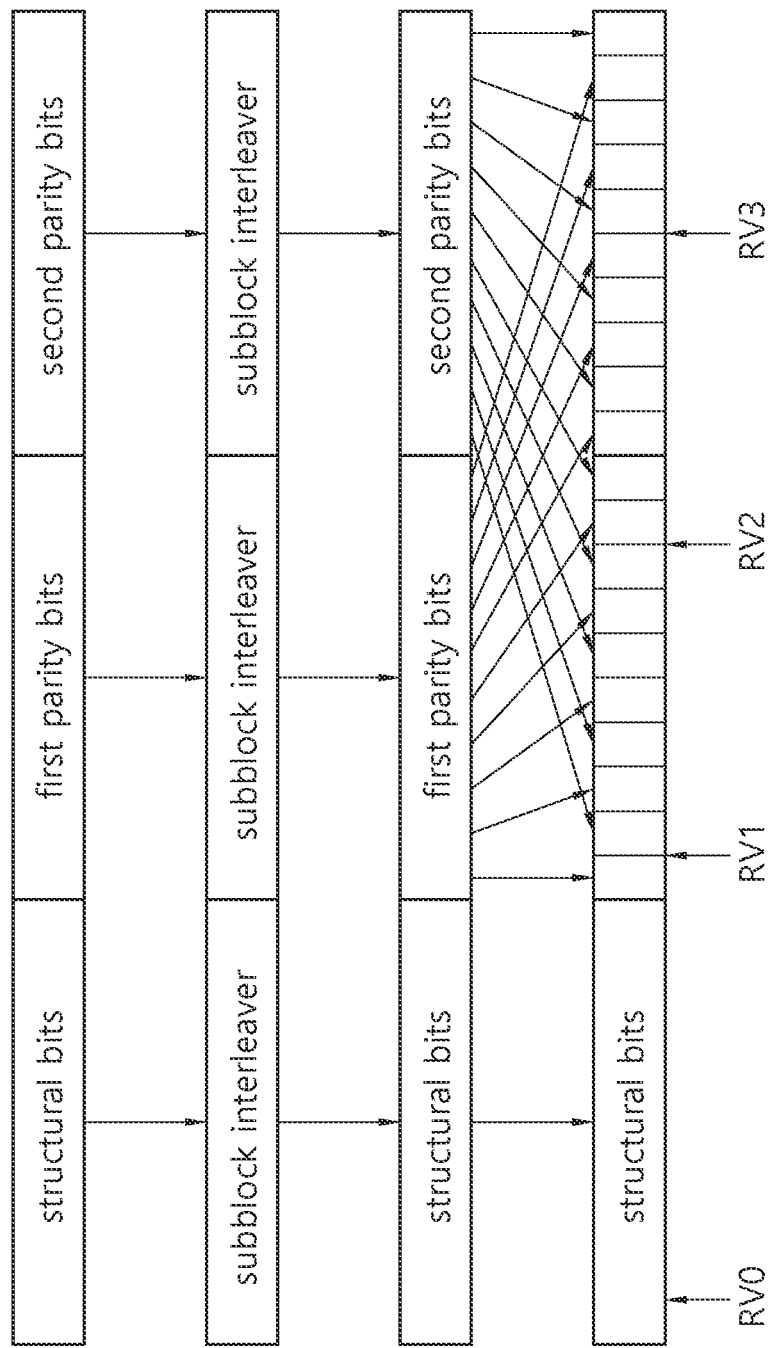
FIG. 12 shows an example of channel coding, in accordance with an embodiment of the present disclosure.

FIG. 12 shows an example of channel coding, in accordance with an embodiment of the present disclosure.

Referring to FIG. 12, a code block may include systematic bits, first parity bits, and second parity bits. The code block may be interleaved through a subblock interleaver. The interleaved code block may compose a mother transport block by being stored in a circular buffer of length Kw. In this case, the size of the circular buffer may be adjusted according to the buffer size of the UE. The code block may be rate matched according to the size of the reception buffer of the UE.

In the case of the Incremental Redundancy (IR) type HARQ, the redundancy version (RV) may be changed for each retransmission. An initial position in the buffer for retransmission may be defined according to the RV. The initial transport block of HARQ may be composed of a data block of a pre-determined length with RV0 as a starting point in the mother transport block, and the first retransmission block may be composed of a data block of a pre-determined length with RV1 as a starting point in the mother transport block.

Meanwhile, QoS requirements for each V2X service may be different. For example, reliability, priority, minimum required communication range (MCR), latency, data rate, etc. may be different for each V2X service. Accordingly, for example, for services that require low latency and high reliability at the same time (e.g., ultra-reliable low latency communication, URLLC), the transmitting UE must deliver the services with a high success rate within a small delay budget. Hereinafter, a method and an apparatus for a UE to efficiently transmit a service having a specific requirement (e.g., a service requiring low delay and high reliability) will be described according to an embodiment of the present disclosure. In this specification, a service may be a concept including at least one of a packet, a transport block (TB), data, or a message. For example, in this specification, that the UE transmits a service may include that the UE transmits a packet, transport block, data, or message related to the service.

According to an embodiment of the present disclosure, when a maximum of 'K' retransmissions are allowed for a specific service, the maximum number of possible transmissions of the UE may be 'K+1' times including one initial transmission. For retransmission of the specific service, two methods may be considered. For example, in a first method, the transmitting UE may perform blind retransmission for 'N' transmissions including the initial transmission, and the transmitting UE may determine/perform whether to retransmit based on sidelink HARQ feedbacks received from the receiving UE for the remaining transmissions of 'maximum number of transmissions–N' times. For example, in a second method, the transmitting UE may perform blind retransmission for 'N' transmissions including the initial transmission, and the transmitting UE may perform blind retransmission for the remaining transmissions of 'maximum number of transmissions–N' times. In this specification, for example, blind retransmission may mean that the transmitting UE retransmits a service regardless of whether the receiving UE has successfully received the service. In this specification, for example, retransmission or retransmission based on a HARQ feedback may mean that the transmitting UE retransmits a service based on the HARQ feedback from the receiving UE. For example, which retransmission method of the first method or the second method the UE uses may be determined by the UE for each service. For example, which retransmission method of the first method or the second method the UE uses may be configured by the base station. For example, which retransmission method of the first method or the second method the UE uses may be pre-configured by the base station.

According to an embodiment of the present disclosure, the 'N' may be configured differently according to service-related QoS requirements (e.g., reliability and/or latency), congestion level, transmission parameters, transmission scheme type, transport block size and/or sidelink link quality. For example, the congestion level may include a congestion level on a resource pool or a congestion level on a system. Alternatively, for example, a ratio between the 'N' and the 'maximum number of transmissions–N' may be configured differently according to service-related QoS requirements (e.g., reliability and/or latency), congestion level, transmission parameters, transmission scheme type, transport block size and/or sidelink link quality. Alternatively, for example, a ratio between the 'N–1 excluding initial transmission' and the 'maximum number of transmissions–N' may be configured differently according to service-related QoS requirements (e.g., reliability and/or latency), congestion level, transmission parameters, transmission scheme type, transport block size and/or sidelink link quality. For example, the transmission parameter or the transmission scheme type may include MCS, number of RBs, transmission power, and channel occupancy ratio (CR) limit. For example, for a service having low delay and high reliability requirement, N may be configured to a relatively large value. For example, for a service having low delay and high reliability requirement, the UE may determine N as a value larger than a threshold value. For example, for a service having high delay and low reliability requirement, N may be configured to a relatively small value. For example, for a service having high delay and low reliability requirement, the UE may determine N as a value smaller than a threshold value.

According to an embodiment of the present disclosure, after the receiving UE has completed receiving 'N' times from the transmitting UE for a service, the receiving UE may be configured to transmit information on whether service reception is successful (e.g., sidelink HARQ feedback) to the transmitting UE. In this case, for example, if the receiving UE successfully receives the service from the transmitting UE, and the receiving UE feeds back an ACK to the transmitting UE, the transmitting UE may omit/stop the remaining 'maximum number of transmissions–N' transmissions.

According to an embodiment of the present disclosure, in the second method, the transmitting UE may perform blind retransmission for the remaining transmissions of 'maximum number of transmissions–N' times. In this case, for example, after the receiving UE completes reception of the remaining transmissions of the 'maximum number of transmissions–N' times from the transmitting UE, the receiving UE may be configured to transmit information on whether the service has been successfully received (e.g., sidelink HARQ feedback) to the transmitting UE. Alternatively, after the receiving UE completes reception of the remaining transmissions of the 'maximum number of transmissions–N' times from the transmitting UE, the receiving UE may be configured to omit/stop the sidelink HARQ feedback. According to an embodiment of the present disclosure, in the first method, the transmitting UE may perform retransmission for the remaining transmissions of 'maximum number of transmissions–N' times. In this case, for the K+1-th transmission (i.e., the last retransmission), the receiving UE may be configured to omit/stop the sidelink HARQ feedback. The reason for the above configuration is that even though the transmitting UE receives the HARQ feedback for the last retransmission, the transmitting UE has already reached the maximum possible transmission number and cannot perform additional retransmission. Since the receiving UE is configured to omit HARQ feedback for the last retransmission, the receiving UE may not transmit meaningless HARQ feedback. Therefore, delay due to unnecessary sidelink HARQ feedback transmission of the receiving UE can be prevented, and the transmitting UE can more flexibly respond to delay requirement.

According to an embodiment of the present disclosure, the transmission parameter or the transmission scheme type may be applied/configured differently for the 'N' transmission and the 'maximum number of transmissions-N' transmission. For example, the transmission power related to the 'N' number of transmissions may be configured/allowed to be higher than the transmission power related to the 'maximum number of transmissions-N' transmissions. Through the above configure, the transmitting UE can increase the probability that the receiving UE will receive the service within 'N' times.

According to an embodiment of the present disclosure, the redundancy version (RV) pattern/value used for the 'N' transmission may be pre-configured for the UE. Alternatively, for example, the RV pattern/value used for the 'N' transmission and the 'maximum number of transmission–N' transmission may be pre-configured for the UE. For example, in the case of an incremental redundancy (IR) HARQ operation, the RV pattern/value used for the 'N' transmission may be pre-configured for the UE. For example, in the case of an IR HARQ operation, the RV pattern/value used for the 'N' transmission and the 'maximum number of transmissions–N' transmission may be pre-configured for the UE.

The RV pattern/value used for the 'N' transmission may be the same. For example, in a channel environment in which the same RV value is preferred, the transmitting UE may perform the 'N' initial transmission and blind retransmission based on the same RV (e.g., RV0). Alternatively, the RV pattern/value used for the 'N' transmission may be different. For example, in a channel environment in which different RV values are preferred, the transmitting UE may perform the 'N' initial transmission and blind retransmission based on different RVs (e.g., RV0, RV1, RV2 or RV3). For example, the RV pattern/value used for the 'maximum number of transmissions–N' transmissions may be the same.

Alternatively, the RV pattern/value used for the 'maximum number of transmissions–N' transmissions may be different. For example, the RV pattern/value used for the 'N' transmission and the 'maximum number of transmissions–the RV pattern/value used for the N' transmission may be the same. Alternatively, the RV pattern/value used for the 'N' transmission and the RV pattern/value used for the 'maximum transmission number–N' transmission may be different. For example, the RV pattern/value may be configured to various values for the UE.

According to an embodiment of the present disclosure, the UE may set the RV pattern/value used for the 'N' transmission by itself. Alternatively, for example, the UE may set the RV pattern/value used for the 'N' transmissions and the 'maximum number of transmissions-N' transmissions. For example, the RV pattern/value may be set by the transmitting UE based on a HARQ feedback from the receiving UE. For example, the transmitting UE may determine the RV pattern/value based on the HARQ feedback received from the receiving UE. For example, the RV pattern/value may be set by the transmitting UE based on CSI information. For example, the transmitting UE may set the RV pattern/value based on the CSI information. Additionally, the transmitting UE may transmit the RV pattern/value to the receiving UE. For example, the RV pattern/value may be included in the SCI. Additionally, the transmitting UE may receive the RV pattern/value of the receiving UE from the receiving UE. For example, the RV pattern/value may be exchanged between the transmitting UE and the receiving UE through a PC5 RRC connection.

Figure 13:
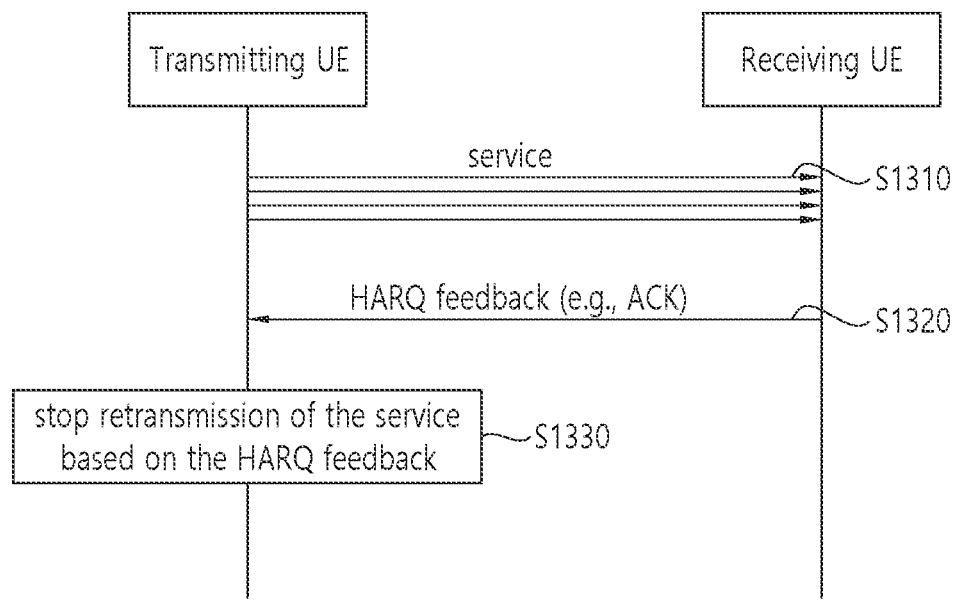
FIG. 13 shows a procedure for the transmitting UE to perform blind retransmission based on the first method or the second method, in accordance with an embodiment of the present disclosure.

FIG. 13 shows a procedure for the transmitting UE to perform blind retransmission based on the first method or the second method, in accordance with an embodiment of the present disclosure.

In the embodiment of FIG. 13, it is assumed that a maximum of six retransmissions are allowed for the transmitting UE. That is, in the above description, it is assumed that K is 6. In this case, the maximum transmission possible number of the transmitting UE may be a total of seven times including the initial transmission. In addition, it is assumed that the transmitting UE determines/sets N to 4 for the service to be transmitted based on service-related QoS requirements (e.g., reliability and/or latency), congestion level, transmission parameter, transmission scheme type, transport block size and/or sidelink link quality. Accordingly, the remaining number of retransmissions may be determined to be three times.

Referring to FIG. 13, in step S1310, the transmitting UE may perform blind transmission for a service four times. That is, for example, the transmitting UE may perform blind retransmission three times regardless of the HARQ feedback for the initial transmission.

In step S1320, the transmitting UE may receive a HARQ feedback from the receiving UE. For example, when the HARQ feedback is a HARQ ACK, the HARQ ACK may be HARQ feedback for one initial transmission and three blind retransmissions. For example, if the receiving UE succeeds in receiving at least one of the four transmissions for the service, the receiving UE may transmit a HARQ ACK to the transmitting UE.

In step S1330, the transmitting UE may stop retransmission of the service based on the HARQ feedback. Accordingly, even though three retransmission opportunities (the first method) or three blind retransmission opportunities (the second method) remain, the transmitting UE may not perform retransmission or blind retransmission for the service.

That is, the transmitting UE may skip/stop the remaining three retransmissions or blind retransmissions.

Figure 14:
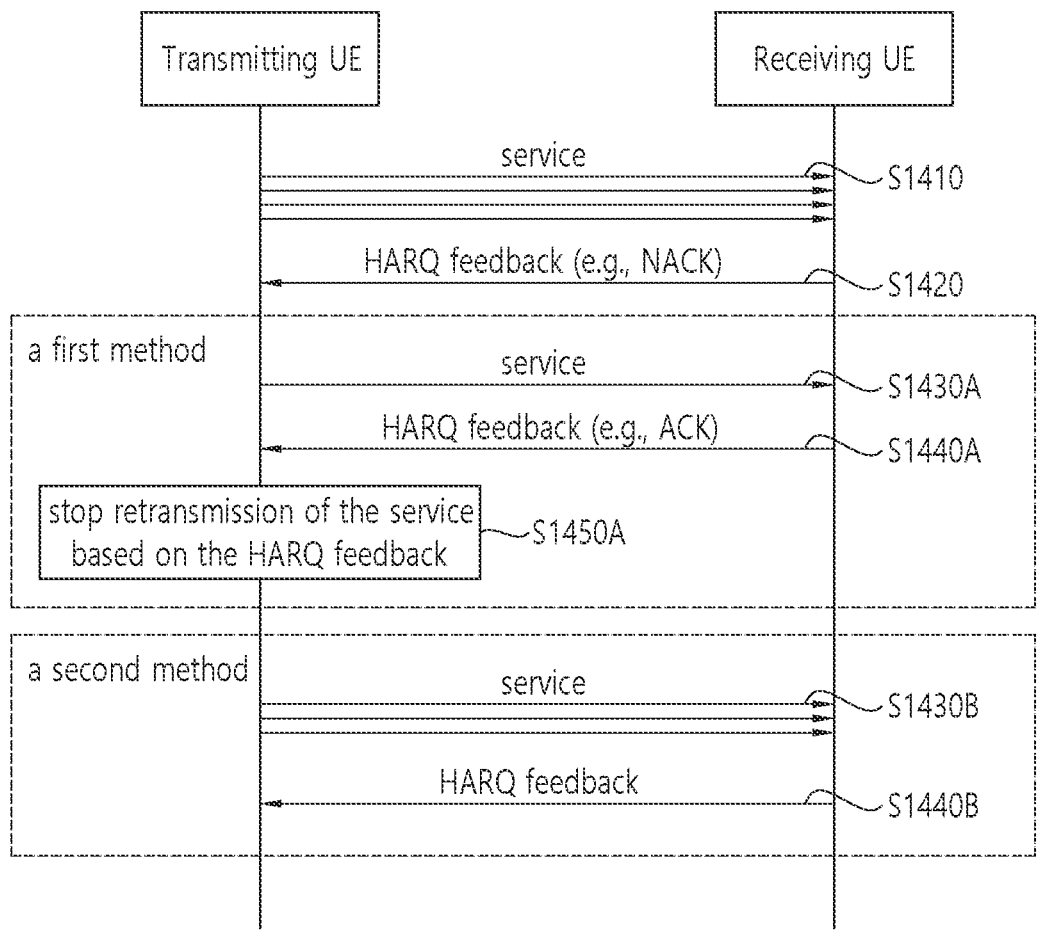
FIG. 14 shows a procedure in which a transmitting UE performs blind retransmission or retransmission based on the first method or the second method, in accordance with an embodiment of the present disclosure.

FIG. 14 shows a procedure in which a transmitting UE performs blind retransmission or retransmission based on the first method or the second method, in accordance with an embodiment of the present disclosure.

As shown in FIG. 13, in the embodiment of FIG. 14, it is assumed that a maximum of six retransmissions are allowed. Accordingly, the maximum transmission possible number of the transmitting UE may be a total of seven times including the initial transmission. And, it is assumed that the UE determines/sets N to 4 for the service to be transmitted. Accordingly, the remaining number of retransmissions may be determined to be three times.

Referring to FIG. 14, in step S1410, the transmitting UE may perform blind transmission for a service four times. That is, for example, the transmitting UE may perform blind retransmission three times regardless of the HARQ feedback for the initial transmission.

In step S1420, the transmitting UE may receive a HARQ feedback from the receiving UE. For example, when the HARQ feedback is a HARQ NACK, the HARQ NACK may be HARQ feedback for one initial transmission and three blind retransmissions. For example, if the receiving UE fails to receive all four transmissions for the service, the receiving UE may transmit a HARQ NACK to the transmitting UE.

In the case of the first method, in response to the HARQ NACK, in step S1430A, the transmitting UE may retransmit the service to the receiving UE. In the case of the first method, for example, the transmitting UE may perform retransmission for the remaining three transmissions. For example, the retransmission for the remaining three transmissions may be retransmission based on the HARQ feedback. Accordingly, in step S1440A, the transmitting UE may receive a HARQ feedback for the service retransmitted once in step S1430A from the receiving UE. It is assumed that the HARQ feedback is ACK. Accordingly, in step S1450A, the transmitting UE may stop retransmission of the service. Although not shown in FIG. 14, the receiving UE may be configured to omit a HARQ feedback for the last retransmission of the transmitting UE. In this case, for example, the receiving UE may not transmit a HARQ feedback for the sixth retransmission (i.e., the last retransmission) of the transmitting UE.

In the case of the second method, in response to the HARQ NACK, in step S1430B, the transmitting UE may retransmit the service to the receiving UE. In the case of the second method, for example, the transmitting UE may perform retransmission for the remaining three transmissions. In step S1440B, the transmitting UE may receive one HARQ feedback for three blind retransmissions from the receiving UE. For example, the transmitting UE may determine whether the receiving UE has successfully received the service based on the HARQ feedback. Alternatively, the transmitting UE may not receive the HARQ feedback for three blind retransmissions from the receiving UE. Although not shown in FIG. 14, the receiving UE may be configured to omit a HARQ feedback for the last retransmission of the transmitting UE. That is, for example, the receiving UE may not transmit a HARQ feedback for the last retransmission.

According to an embodiment of the present disclosure, an additional delay caused by a retransmission operation based on sidelink feedback reception may be reduced. For example, when the transmitting UE performs blind retransmission once, the transmitting UE may perform initial transmission in the A-th slot and retransmission in the A+B-th slot. On the other hand, when the transmitting UE performs HARQ feedback-based retransmission once, the transmitting UE may perform initial transmission in the A-th slot, and may receive a HARQ feedback related to the initial transmission in the A+B-th slot, and may perform retransmission in the A+B+C-th slot. That is, HARQ feedback-based retransmission has a delay of C slots until retransmission compared to blind retransmission. Therefore, according to an embodiment of the present disclosure, an additional delay caused by a retransmission operation based on sidelink feedback reception can be reduced.

Furthermore, according to an embodiment of the present disclosure, since the receiving UE is configured to omit HARQ feedback for the last retransmission, the receiving UE may not transmit meaningless HARQ feedback. Through this, delay due to unnecessary sidelink HARQ feedback transmission of the receiving UE can be prevented, and the transmitting UE can more flexibly respond to delay requirements.

Furthermore, according to an embodiment of the present disclosure, the transmitting UE may adjust the value of N in order to effectively satisfy the requirements of low delay and high reliability at the same time. For example, the transmitting UE may set a large value of N for a specific service requiring low delay and high reliability, and the transmitting UE may transmit the specific service to the receiving UE according to the requirement by performing blind retransmission N times.

Figure 15:
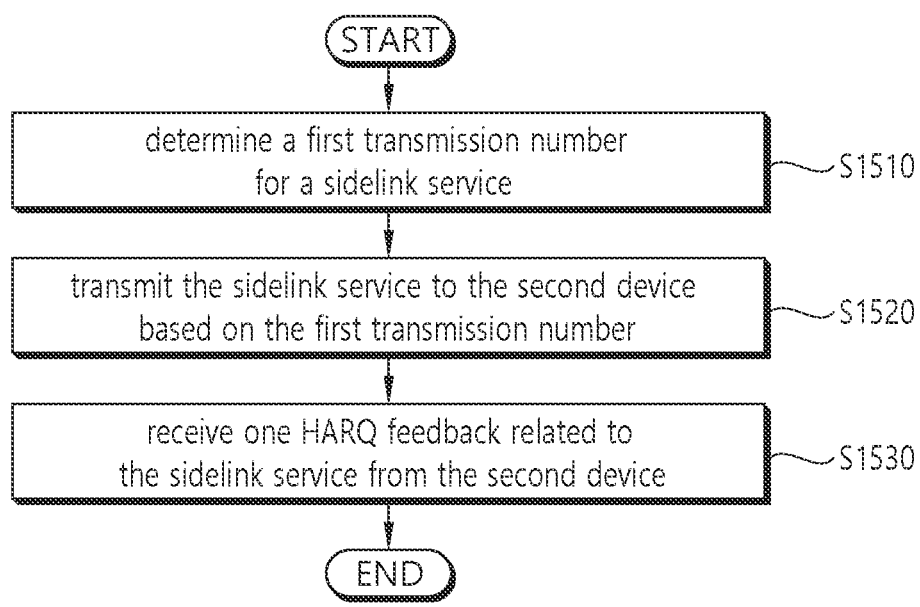
FIG. 15 shows a method in which the first device 100 retransmits a service to the second device 200, in accordance with an embodiment of the present disclosure.

FIG. 15 shows a method in which the first device 100 retransmits a service to the second device 200, in accordance with an embodiment of the present disclosure.

Referring to FIG. 15, in step S1510, the first device 100 may determine a first transmission number for a sidelink service. For example, the first transmission may include at least one blind retransmission. For example, the blind retransmission may be that the first device 100 retransmits the sidelink service regardless of whether the second device 200 successfully receives the sidelink service. For example, the first transmission number may include an initial transmission number. For example, the maximum transmission number of the sidelink service may include the first transmission number and a second transmission number. For example, the first device 100 may determine the first transmission number based on at least one of a quality of service (QoS) requirement related to the sidelink service, a congestion level, a transmission parameter, a size of a transport block or a sidelink link quality. For example, the first device 100 may determine a ratio of the first transmission number and the second transmission number based on at least one of a QoS requirement related to the sidelink service, a congestion level, a transmission parameter, a size of a transport block or a sidelink link quality. For example, when the sidelink service is a service requiring low delay, the first device 100 may determine the first transmission number as a value larger than a pre-configured threshold value. For example, a transmission parameter for the first transmission and a transmission parameter for the second transmission may be configured differently. For example, the transmission parameter may include at least one of a modulation and coding scheme (MCS), the number of resource blocks (RBs), transmission power or a channel occupancy ratio limit. For example, a redundancy version (RV) pattern related to the first transmission may be pre-configured. For example, the first device 100 may set an RV pattern related to the second transmission based on a HARQ feedback received from the second device 200. For example, the first device 100 may set an RV pattern related to the first transmission based on channel state information (CSI) information. For example, the first device 100 may transmit information related to an RV pattern for the sidelink service to the second device 200.

In step S1520, the first device 100 may transmit the sidelink service to the second device based on the first transmission number.

In step S1530, the first device 100 may receive one HARQ feedback related to the sidelink service from the second device 200. For example, based on the HARQ feedback related to the sidelink service, the first device 100 may retransmit the sidelink service to the second device 200 as many times as the second transmission number. For example, the first device 100 may perform blind retransmission of the sidelink service to the second device 200 as many times as the second transmission number based on the HARQ feedback related to the sidelink service. For example, after retransmission is performed as many times as the second transmission number, the second device 200 may be configured not to transmit a HARQ feedback to the first device 100.

Figure 16:
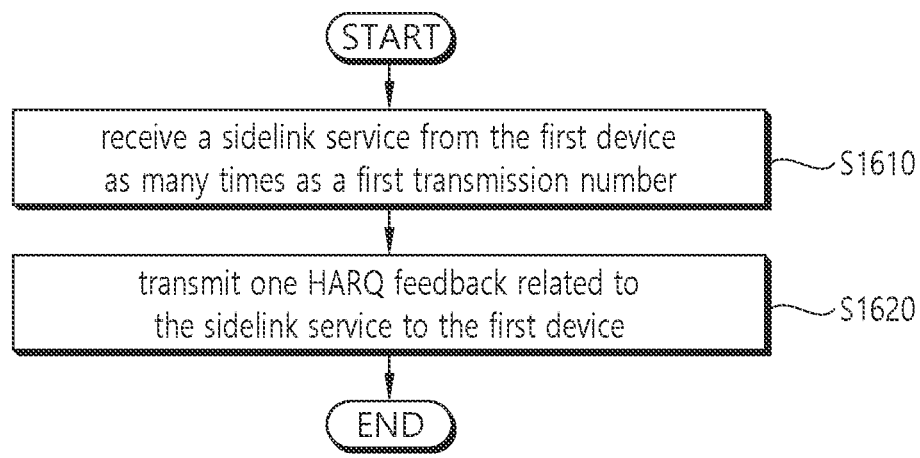
FIG. 16 shows a method in which the second device 200 receives a service from the first device 100, in accordance with an embodiment of the present disclosure.

FIG. 16 shows a method in which the second device 200 receives a service from the first device 100, in accordance with an embodiment of the present disclosure.

Referring to FIG. 16, in step S1610, the second device 200 may receive a sidelink service from the first device 100 as many times as a first transmission number. For example, the first transmission number for the sidelink service may be determined by the first device 100. For example, the first transmission may include at least one blind retransmission. For example, the blind retransmission may be that the first device 100 retransmits the sidelink service regardless of whether the second device 200 successfully receives the sidelink service. For example, the first transmission number may include an initial transmission number. For example, the maximum transmission number of the sidelink service may include the first transmission number and a second transmission number. For example, the first transmission number may be determined by the first device 100, based on at least one of a quality of service (QoS) requirement related to the sidelink service, a congestion level, a transmission parameter, a size of a transport block or a sidelink link quality. For example, a ratio of the first transmission number and the second transmission number may be determined by the first device 100, based on at least one of a QoS requirement related to the sidelink service, a congestion level, a transmission parameter, a size of a transport block or a sidelink link quality. For example, when the sidelink service is a service requiring low delay, the first transmission number may be determined by as a value larger than a pre-configured threshold value, by the first device 100. For example, a transmission parameter for the first transmission and a transmission parameter for the second transmission may be configured differently. For example, the transmission parameter may include at least one of a modulation and coding scheme (MCS), the number of resource blocks (RBs), transmission power or a channel occupancy ratio limit. For example, a redundancy version (RV) pattern related to the first transmission may be pre-configured. For example, an RV pattern related to the second transmission may be set based on a HARQ feedback received from the second device 200, by the first device 100. For example, an RV pattern related to the first transmission may be set based on channel state information (CSI) information, by the first device 100. For example, the second device 200 may receive information related to an RV pattern for the sidelink service from the first device 100.

In step S1620, the second device 200 may transmit one HARQ feedback related to the sidelink service to the first device 100. For example, the second device 200 may receive the HARQ feedback-based sidelink service from the first device 100 as many times as the second number of transmissions. For example, the second device 200 may receive the sidelink service in which blind retransmission is performed from the first device 100 as many times as the second transmission number. For example, the second transmission may be performed by the first device 100 based on a HARQ feedback related to the sidelink service. For example, the second device 200 may be configured not to transmit a HARQ feedback to the first device 100 after receiving the sidelink service as many times as the second transmission number.

Since examples of the above-described proposed method may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods. A rule may be defined so that the base station informs the terminal of whether the proposed methods are applied or not (or information about the rules of the proposed methods), or the transmitting terminal informs the receiving terminal through a predefined signal (e.g., physical layer signal or higher layer signal).

Various embodiments of the present disclosure may be applied not only to vehicle-to-vehicle communication, but also to vehicle-to-pedestrian communication, vehicle-to-base station communication, or vehicle-to-fixed node communication. For example, in communication with a base station, the position and speed of the counterpart receiver may be regarded as fixed.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
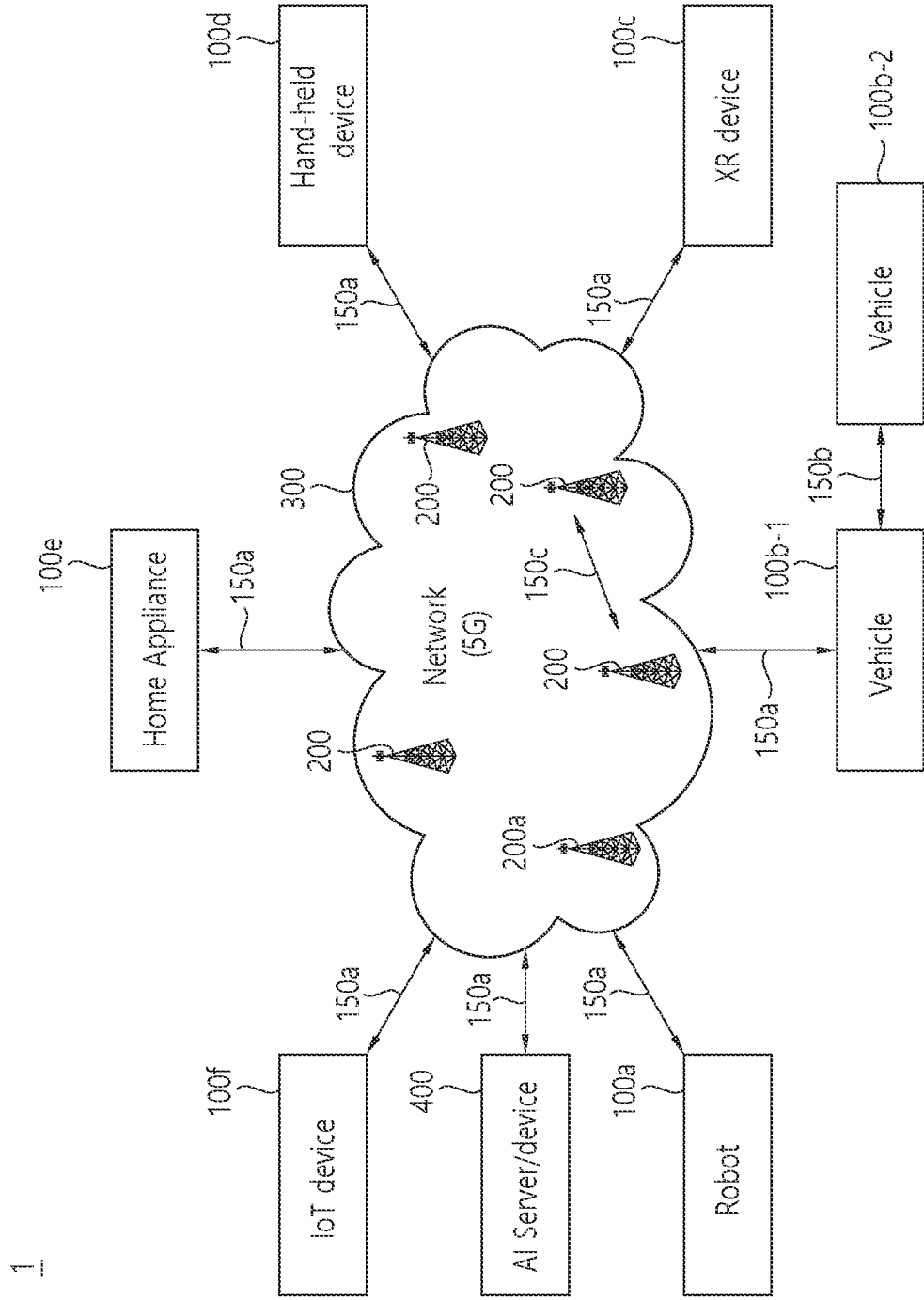
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook).

The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
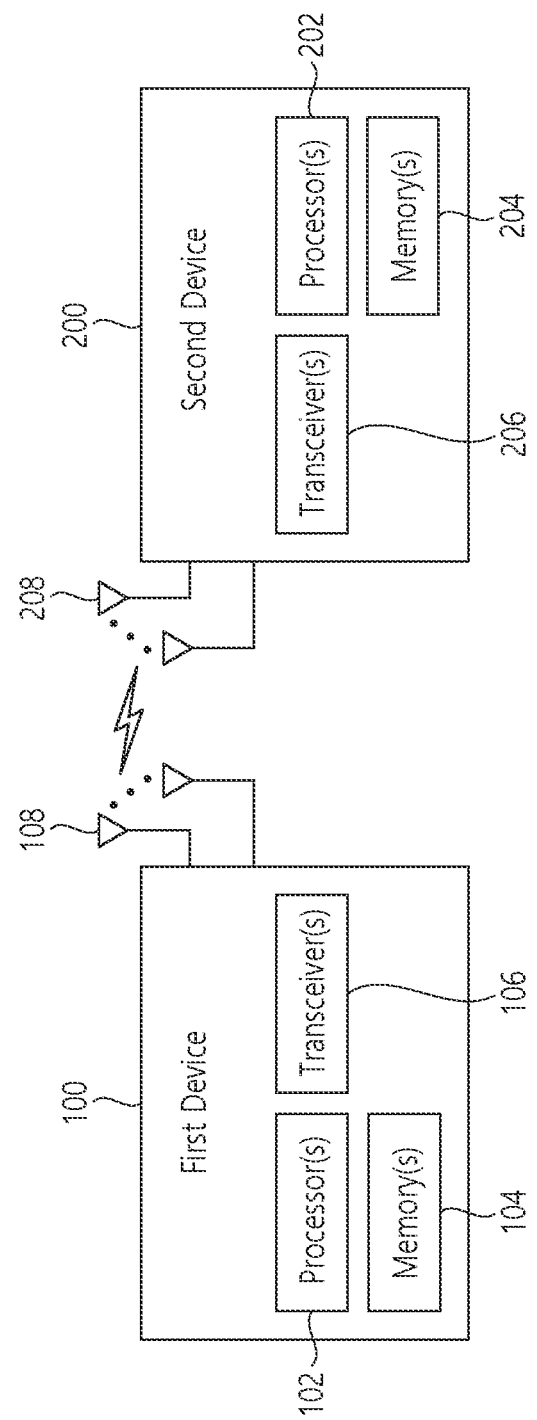
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
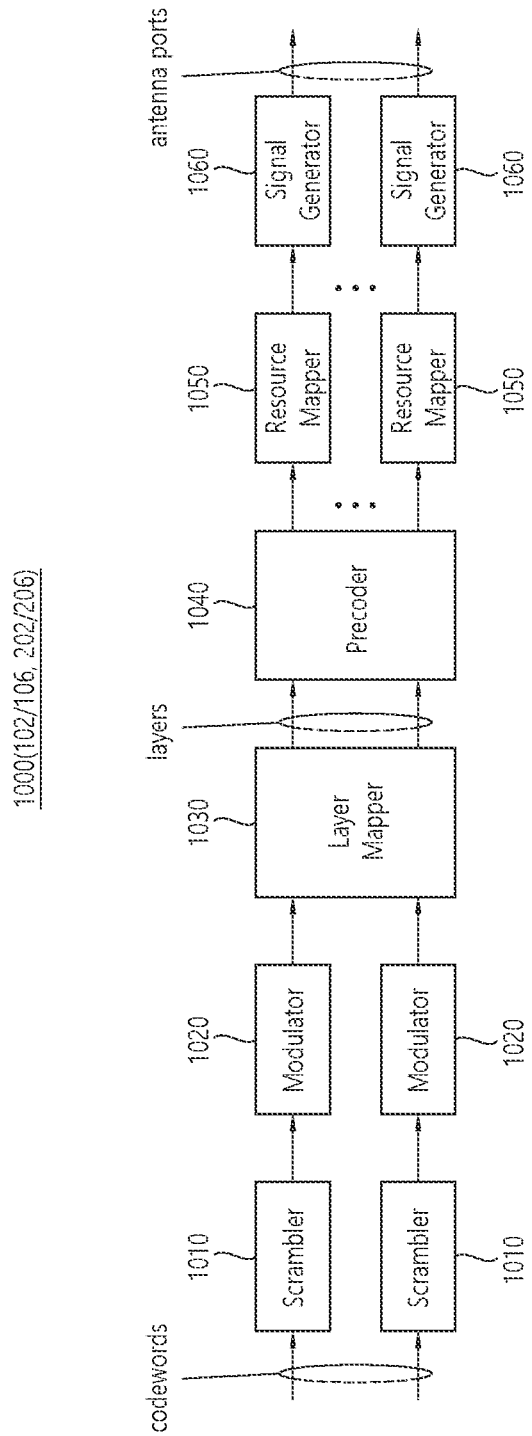
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may Include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
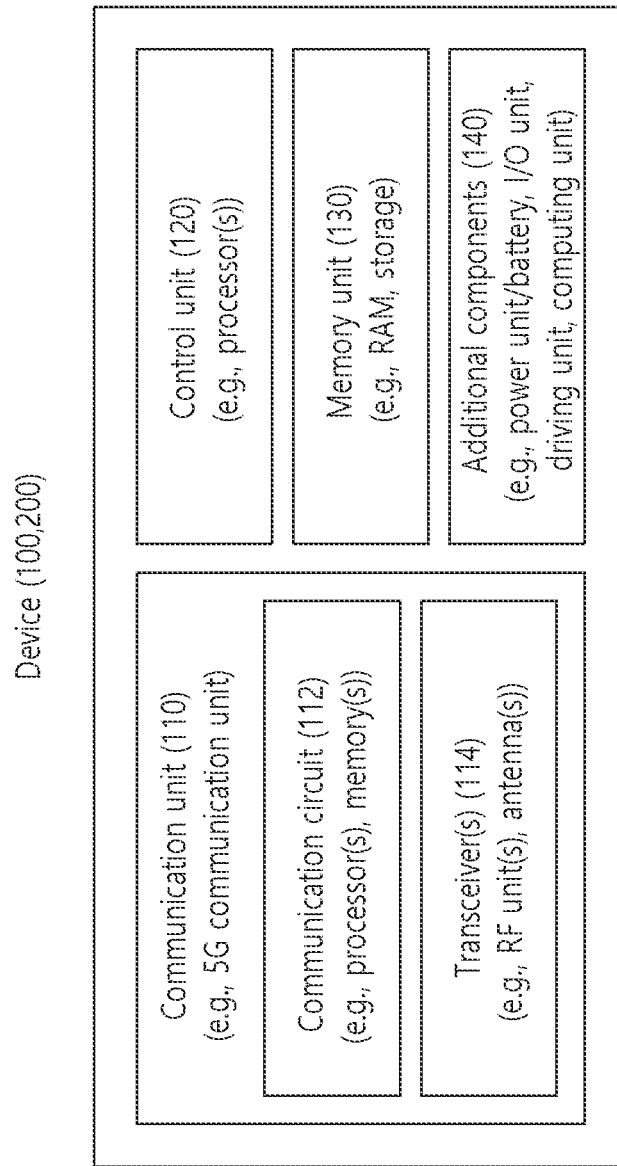
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
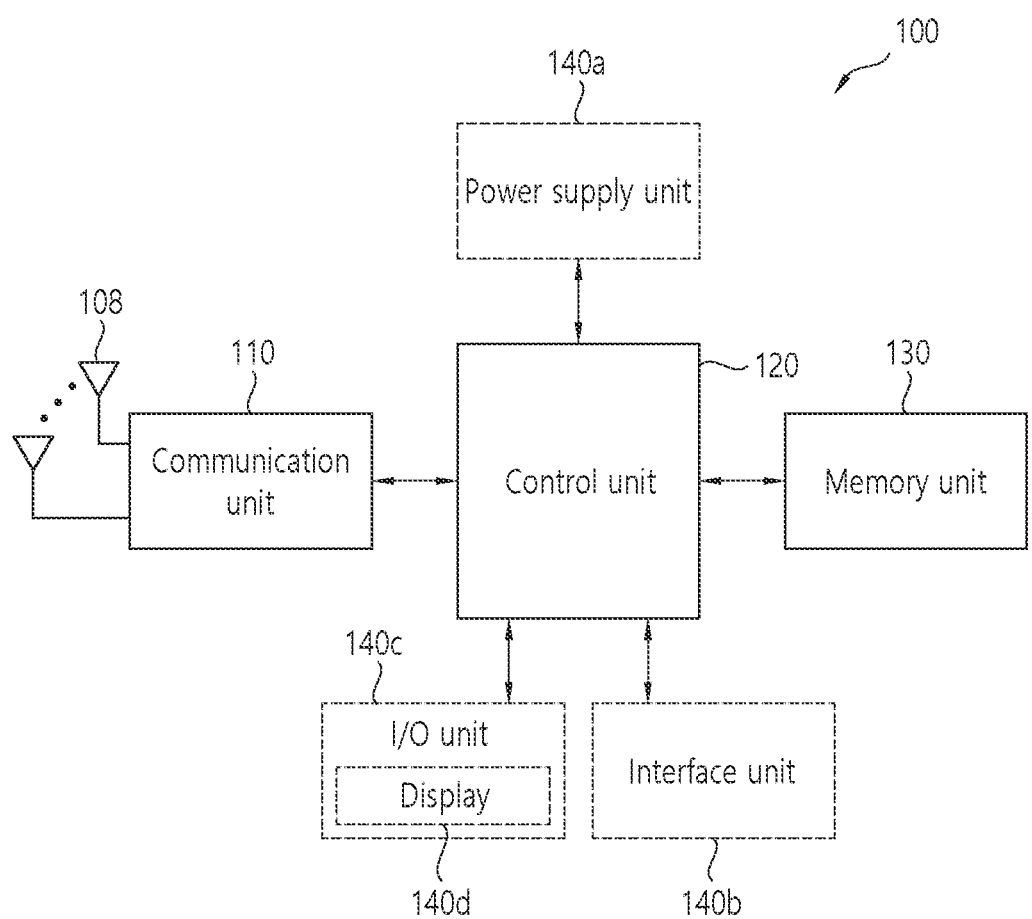
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 22:
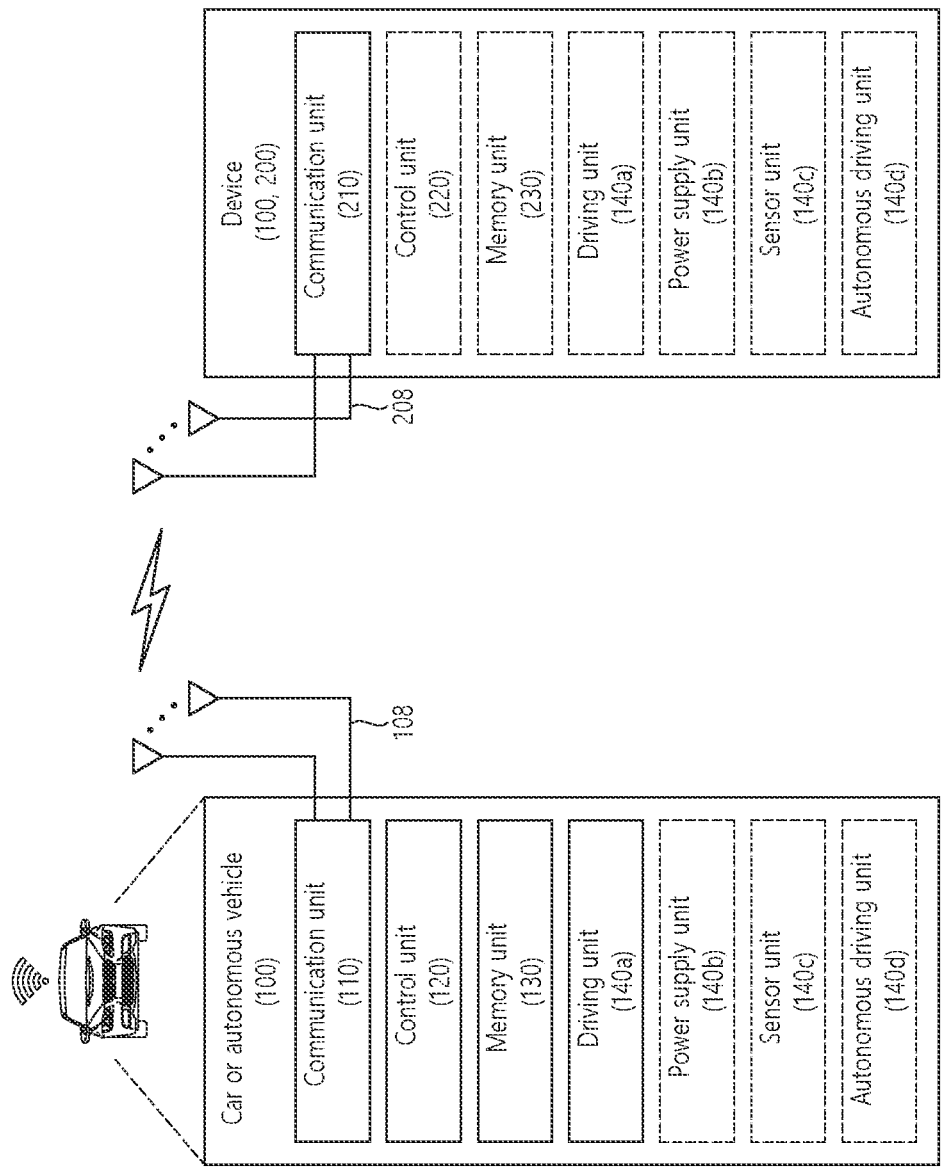
FIG. 22 shows a car or an autonomous vehicle, in accordance with an embodiment of the present disclosure.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    determining a first transmission number for a sidelink service;
    performing a first transmission related to the sidelink service to a second device based on the first transmission number; and
    receiving one hybrid automatic repeat request (HARQ) feedback related to the sidelink service from the second device,
    wherein the first transmission comprises at least one blind retransmission.

2. The method of claim 1, wherein the first transmission number is determined based on at least one of a quality of service (QoS) requirement related to the sidelink service, a congestion level, a transmission parameter, a size of a transport block or a sidelink link quality.

3. The method of claim 1, wherein the blind retransmission is that the first device retransmits the sidelink service regardless of whether the second device has successfully received the sidelink service,
    wherein the first transmission number includes an initial transmission number, and
    wherein the maximum transmission number of the sidelink service includes the first transmission number and a second transmission number.

4. The method of claim 3, wherein a ratio of the first transmission number and the second transmission number is determined based on at least one of a QoS requirement related to the sidelink service, a congestion level, a transmission parameter, a size of a transport block or a sidelink link quality.

5. The method of claim 3, wherein a transmission parameter for the first transmission and a transmission parameter for a second transmission are configured differently from each other.

6. The method of claim 5, wherein the transmission parameter includes at least one of a modulation and coding scheme (MCS), a number of resource blocks (RBs), transmission power, or a channel occupancy ratio limit.

7. The method of claim 3, further comprising:
    retransmitting the sidelink service to the second device as many times as the second transmission number based on a HARQ feedback related to the sidelink service.

8. The method of claim 7, wherein the second device is configured not to transmit a HARQ feedback to the first device after receiving the sidelink service as many times as the second transmission number.

9. The method of claim 3, further comprising:
    performing blind retransmission of the sidelink service to the second device as many times as the second transmission number based on a HARQ feedback related to the sidelink service.

10. The method of claim 3, further comprising:
    setting a RV pattern related to a second transmission based on a HARQ feedback received from the second device.

11. The method of claim 1, wherein the first transmission number is determined as a value larger than a pre-configured threshold value based on that the sidelink service is a service requiring a low delay.

12. The method of claim 1, further comprising:
    setting a redundancy version (RV) pattern related to the first transmission based on channel state information (CSI) information.

13. The method of claim 1, further comprising:
    transmitting information related to a RV pattern for the sidelink service to the second device.

14. A first device for performing wireless communication, the first device comprising:
    one or more memories storing instructions;
    one or more transceivers; and
    one or more processors connected to the one or more memories and the one or more transceivers, wherein the one or more processors execute the instructions to:
    determine a first transmission number for a sidelink service,
    perform a first transmission related to the sidelink service to a second device based on the first transmission number,
    receive one hybrid automatic repeat request (HARQ) feedback related to the sidelink service from the second device,
    wherein the first transmission comprises at least one blind retransmission.

15. An device configured to control a first user equipment (UE), the device comprising:
    one or more processors; and
    one or more memories being operably connectable to the one or more processors and storing instructions, wherein the one or more processors execute the instructions to:
    determine a first transmission number for a sidelink service, perform a first transmission related to the sidelink service to a second UE based on the first transmission number, receive one hybrid automatic repeat request (HARQ) feedback related to the sidelink service from the second UE, wherein the first transmission comprises at least one blind retransmission.

\* \* \* \* \*